United States Patent
Goeman et al.

(10) Patent No.: US 6,476,114 B2
(45) Date of Patent: *Nov. 5, 2002

(54) THERMOPLASTIC POLYMER FILM COMPRISING A FLUOROCHEMICAL COMPOUND

(75) Inventors: Bart Goeman, Temse (BE); Rolf D. Spielmann, Hilden (DE)

(73) Assignee: 3M Innovative Properties Company, St. Paul, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/554,527

(22) PCT Filed: Nov. 16, 1998

(86) PCT No.: PCT/US98/24489

§ 371 (c)(1),
(2), (4) Date: May 12, 2000

(87) PCT Pub. No.: WO99/25760

PCT Pub. Date: May 27, 1999

(65) Prior Publication Data

US 2002/0058744 A1 May 16, 2002

(51) Int. Cl.$^7$ ................................................ C08K 5/02
(52) U.S. Cl. ...................................... 524/462; 524/463
(58) Field of Search ................................. 524/462, 463

(56) References Cited

U.S. PATENT DOCUMENTS

| | | | |
|---|---|---|---|
| 2,723,999 A | 11/1955 | Cowen et al. | 260/615 |
| 2,915,554 A | 12/1959 | Ahlbrecht et al. | 260/556 |
| 3,787,351 A | 1/1974 | Olson | 260/40 R |
| 4,089,997 A * | 5/1978 | Paessehen | 427/171 |
| 4,171,397 A * | 10/1979 | Morrow | 428/195 |
| 4,913,970 A | 4/1990 | Hayward et al. | 428/423.7 |
| 4,976,741 A | 12/1990 | Hisamoto et al. | 8/115.6 |
| 5,043,195 A | 8/1991 | Skrivseth | 528/35.3 |
| 5,244,951 A | 9/1993 | Gardiner | 524/168 |
| 5,294,662 A * | 3/1994 | Moore | 524/516 |
| 5,508,330 A * | 4/1996 | Coughlin | 524/251 |
| 5,565,265 A * | 10/1996 | Rubin | 428/265 |
| 5,804,625 A * | 9/1998 | Temperante | 524/188 |
| 6,127,485 A * | 10/2000 | Klun | 524/199 |
| 6,174,964 B1 * | 1/2001 | Jariwala | 525/276 |

FOREIGN PATENT DOCUMENTS

| | | | |
|---|---|---|---|
| EP | 0 516 271 A1 | 12/1992 | D01F/1/02 |
| EP | 0 753 606 A3 | 1/1997 | D01F/1/02 |
| WO | WO 92/18569 | 10/1992 | C08L/23/06 |
| WO | WO 95/01396 | 1/1995 | C08L/23/04 |

OTHER PUBLICATIONS

Handbook of Pressure Sensitive Adhesive Technology, Edited by Donatas Sata, Second Edition, pp. 396–493, 1989.
Test Methods for Pressure–Sensitive Tapes, 8$^{th}$ Ed., pp. 25–27.

* cited by examiner

*Primary Examiner*—Paul R. Michl
(74) *Attorney, Agent, or Firm*—Gilbert Voortmans; Lucy C Weiss

(57) ABSTRACT

The invention provides a method of making a film comprising the steps of: (A) providing a film comprising a layer of thermoplastic polymer having dispersed therein a fluorochemical hydrophilicity imparting compound according to the formula: $R_f$—Q—Z—X—T, wherein Rf represents a partially or fully fluorinated aliphatic group having at least 3 carbon atoms, Q is a linking group or a covalent bond, Z is a poly(oxyalkylene) group, X is an oxygen atom or NR wherein R is a hydrogen atom or an alkyl or aryl group, and T is a hydrogen atom or an organic group having no more than 6 carbon atoms; (B) applying a coating comprising at least one non-volatile component on said film; and (C) when said coating contains volatile components, drying said coating to remove said volatile components from said coating. Further provided are single- and multi-layer films.

16 Claims, No Drawings

THERMOPLASTIC POLYMER FILM COMPRISING A FLUOROCHEMICAL COMPOUND

FIELD OF THE INVENTION

The present invention relates to a film comprising a layer of a thermoplastic polymer having a fluorochemical hydrophilicity-imparting compound dispersed therein. In particular, the present invention relates to a film comprising a layer of polypropylene. The present invention also relates to a method of coating such film.

BACKGROUND OF THE INVENTION

Films from extruded thermoplastic polymers, such as poly(alpha)olefins, are widely used in a variety of applications including, for example, as overhead transparencies, packaging materials and backing material for adhesive tapes. In many applications, the films need to be provided with one or more coatings. In order to provide good adhesion and coatability of such coatings, and particularly aqueous-based coatings, it is generally required to treat the film surface with a corona discharge before coating.

While this treatment is generally effective, it makes the film surface rough. Moreover, the effect of a corona discharge treatment on the film surface may degrade with time. Accordingly, corona discharge treatment is generally only useful if it can be done in line with the coating of the film. However, in a number of applications that may not be practical.

Accordingly, there is a need for a solution that can provide the thermoplastic polymer films with good coatability properties that can be maintained over a long period of time and that allow for coatings to be provided to the film with good adherence between the film and the coating. As will be set forth in detail below, the present invention solves this problem by dispersing a fluorochemical hydrophilicity imparting compound in the thermoplastic polymer layer of the film.

While the addition of certain fluorochemicals during the extrusion of thermoplastic polymers is known, the prior art does not disclose or suggest that the addition of a fluorochemical hydrophilicity imparting compound to an extruded thermoplastic polymeric film can provide good coatability properties to the film which can be maintained for a long period of time, nor does the prior art teach or disclose that good adhesion of the coating to the film can be obtained.

EP 0 516 271 discloses the use of a fluoroaliphatic group containing a compound in the extrusion of polypropylene fibers to impart durable wettability properties to the fiber's surface. Particularly exemplified compounds are those that have a perfluorinated alkyl group linked to a poly (oxyalkylene) group terminated with a hydroxyl group or a lower alkyl ether.

WO 92/18569 and WO 95/01396 describe fluorochemical additives for use in the extrusion of thermoplastic polymers to prepare films and fibers with repellency properties. It is specifically disclosed that films can be prepared with good anti-wetting properties. It is further taught that polypropylene films with the fluorochemical dispersed therein have good antistatic properties.

U.S. Pat. No. 5,043,195 further describes a multi-layer sheet material including an electrically insulating film with a conductive layer on the upper surface and an antistatic layer carried by the lower surface. The antistatic layer comprises polyethylene and a fluoroaliphaticsulfonamide polyether compound.

U.S. Pat. No. 3,787,351 discloses the addition of polyethylene oxide containing fluorochemicals to self supporting structural filled or reinforced resinous shaped articles made of, for example, polypropylene. It is stated that the fluorochemical creates better bonding between fillers and the resin such that the amount of voids in the article is minimized.

SUMMARY OF THE INVENTION

The present invention provides a method of making a coated film comprising the steps of:

(A) providing a film comprising a layer of thermoplastic polymer having dispersed therein a fluorochemical hydrophilicity imparting compound according to formula (I):

$$R_f\text{—Q—Z—X—T} \qquad (I)$$

wherein $R_f$ represents a partially or fully fluorinated aliphatic group having at least 3 carbon atoms, Q is a linking group or a covalent bond, Z is a poly(oxyalkylene) group, X is oxygen or NR where R is a hydrogen atom or an alkyl or aryl group, and T is a hydrogen atom or an organic group having not more than 6 carbon atoms;

(B) applying a coating comprising at least one non-volatile component on said film; and (C) when said coating contains volatile components, drying said coating to remove said volatile components from said coating.

In another aspect, this invention provides a film comprising a layer of thermoplastic polymer having dispersed therein a fluorochemical hydrophilicity imparting compound according to formula (I) that is coated on at least one surface with a composition comprising at least one non-volatile component.

One preferred embodiment of the invention is a multi-layer film comprising a first and second layer of thermoplastic polymer, said first and second layer being in contact with each other, said second layer forming an outermost layer of said film and having dispersed therein a fluorochemical hydrophilicity imparting compound according to formula (I), and said first layer being substantially free of the fluorochemical hydrophilicity-imparting compound.

It has been found that the film of the invention can be readily coated without the need for prior treatments such as corona discharge. The film can be readily coated with an aqueous coating and good adhesion of the coating to the film can be obtained. Even films with smooth surfaces can be readily coatable. Finally, it was found that films can be obtained that are bright and highly transparent.

DETAILED DESCRIPTION OF THE INVENTION

It will be understood that in connection with the invention the term "dispersed therein" denotes merely the presence of the fluorochemical hydrophilicity-imparting compound in the thermoplastic polymer without limitation as to where the fluorochemical hydrophilicity-imparting compound is located in the layer. Thus, the fluorochemical hydrophilicity-imparting compound may be uniformly dispersed in the bulk of the polymer or a major portion of the fluorochemical hydrophilicity-imparting compound may have migrated to the surface of the thermoplastic polymer layer.

The films of the invention can consist of a single layer of thermoplastic polymer or the films can consist of multiple layers of thermoplastic polymer. In case the film is a single layer of thermoplastic polymer with the fluorochemical hydrophilicity imparting compound dispersed therein, both major surfaces of the film can be readily coated. When the film consists of multiple layers of thermoplastic polymer, various constructions are possible. For example, the film may consist of two layers of thermoplastic polymer and only one of them contains the fluorochemical hydrophilicity imparting compound. In such a film, the side of the multilayer film comprising the thermoplastic polymer layer with the fluorochemical hydrophilicity imparting compound will be readily coatable. Another embodiment of the film consists of three thermoplastic polymer layers whereby a core layer of thermoplastic polymer without the fluorochemical hydrophilicity imparting compound is provided on each side of a layer of thermoplastic polymer with fluorochemical hydrophilicity imparting compound. Such film is readily coatable on both sides.

Films with multiple layers of thermoplastic polymer are especially preferred in this invention because the above described properties of the film can be obtained without substantially impairing the mechanical properties of the film. Moreover, the properties can be obtained with less fluorochemical hydrophilicity imparting compound than would be needed in case of a film that consists of a single layer. Typically, a multilayer film will have one or two outer layers of thermoplastic polymer with a fluorochemical hydrophilicity imparting compound dispersed therein. The thickness of these outer layers may vary broadly, but it is typically no more than about 30 $\mu$m, preferably between about 0.5 $\mu$m and 30 $\mu$m, and more preferably between about 1 $\mu$m and 15 $\mu$m. The thickness of the thermoplastic layer without the fluorochemical hydrophilicity imparting compound is typically selected to obtain the desired final total thickness of the film. Typically, the total thickness of the films of the present invention will be between about 10 $\mu$m and 500 $\mu$m, and more preferably between about 20 $\mu$m and 250 $\mu$m.

The films can be in the form of a web or they can be in the form of sheets. When desired, the films can be oriented monoaxially or they can be oriented biaxially. Surprisingly, multilayer films of the invention do not delaminate at the interface between layers containing fluorochemical hydrophilicity imparting compound and layers that do not contain the compound, even when the films are oriented by stretching in one or two directions.

Examples of thermoplastic polymers for use in the film include polyesters, polyurethanes, polyamides and poly(alpha)olefins. Preferred thermoplastic polymers are poly(alpha)olefins. Poly(alpha)olefins can include the normally solid, homo-, co- and terpolymers of aliphatic mono-1-olefins (alpha olefins) as they are generally recognized in the art. Usually, the monomers employed in making such poly(alpha)olefins contain about 2 to 10 carbon atoms per molecule, though higher molecular weight monomers sometimes are used as comonomers. The invention is applicable also to blends of the polymers and copolymers prepared mechanically or in situ. Examples of useful monomers that can be employed to prepare the thermoplastic polymers include ethylene, propylene, butene-1, pentene-1, 4-methylpentene-1, hexene-1, and octene-1, alone, or in admixture, or in sequential polymerization systems. Examples of preferred thermoplastic polymers include polyethylene, polypropylene, propylene/ethylene copolymers, polybutylene and blends thereof. Processes for preparing the thermoplastic polymers are well known, and the invention is not limited to a polymer made with a particular catalyst or process.

The fluorochemical hydrophilicity imparting compound is typically used in an amount of at least about 0.2% by weight based on the weight of the thermoplastic polymer and more preferably in an amount of at least about 0.5% by weight. The maximum amount of the fluorochemical hydrophilicity imparting compound is not critical; however, in case of a film consisting of only one layer of thermoplastic polymer, it is preferred to use the lowest amount possible so as not to impair the mechanical properties of the film. Generally, the amount of fluorochemical hydrophilicity-imparting compound is between about 0.3% by weight and 10% by weight, and more preferably between about 0.5% by weight and 6% by weight.

The fluorochemical hydrophilicity-imparting compound corresponds to formula (I) set forth above. In formula (I), $R_f$ represents a partially or fully fluorinated aliphatic group having at least about 3 carbon atoms and preferably at least 4 carbon atoms. $R_f$ is preferably a fluorinated, stable, inert, preferably saturated, non-polar, monovalent alkyl group. It can be straight chain, branched chain, or cyclic or combinations thereof. It can contain heteroatoms, bonded only to carbon atoms, such as oxygen, divalent or hexavalent sulfur, or nitrogen. $R_f$ is preferably a fully-fluorinated alkyl group, but hydrogen or chlorine atoms can be present as substituents but preferably not more than one atom of either is present for every two carbon atoms. The R group has at least about 3 carbon atoms, preferably about 3 to 20 carbon atoms, and more preferably between about 6 carbon atoms and 20 carbon atoms. $R_f$ preferably contains about 40% to 78% fluorine by weight, more preferably about 50% to 78% fluorine by weight. Most preferably, the terminal portion of the $R_f$ radical is a perfluorinated moiety and contains at least 4 perfluorinated carbons, e.g., $CF_3CF_2CF_2CF_2$13 , $(CF_3)_2CFCF_2$—. Preferred $R_f$ groups are preferably those perfluorinated alkyls according to the formula $C_nF_{2n+1}$ where n is about 4 to 14.

In formula (I), Q is typically an organic divalent or multivalent linking group or a covalent bond. Examples of Q groups include straight chain, branched chain or cyclic alkylene, arylene, aralkylene, oxy, sulfonyl, sulfoxy, amino, imino, sulfonamido, carboxyamido, carbonyloxy, urethanylene, ureylene, and combinations thereof such as sulfonamidoalkylene.

The Z group is a poly(oxyalkylene) group that can be depicted by the formula $(OR')_x$, where R' preferably is an alkylene group having about 2 to 4 carbon atoms, such as —$CH_2CH_2$—, —$CH_2CH_2CH_2$—, —$CH(CH_3)CH_2$—, and —$CH(CH_3)CH(CH_3)$— or mixtures thereof, x is preferably a value from about 4 to 25, and more preferably from about 6 to 20. The oxyalkylene units in said poly(oxyalkylene) may be the same, as in poly(oxypropylene), or present as a mixture, such as in a heteric straight or branched chain of randomly distributed oxyethylene and oxypropylene units poly(oxyethylene-co-oxypropylene), or as in a straight or branched chain of blocks of oxyethylene units and blocks of oxypropylene units. The poly(oxyalkylene) chain can be interrupted by or include one or more catenary linkages. The water solubilizing group should provide sufficient hydrophilicity properties to the compound so as to obtain the beneficial hydrophilicity properties on the film. Accordingly, any catenary linkages in the water solubilizing group should not substantially impair the water solubilizing character of the Z group. Furthermore, it is preferred that the majority of oxyalkylene units are oxyethylene units. Thus in accordance with a particularly preferred embodiment, at least about 50% and more preferably at least about 60% of the number oxyalkylene units are oxyethylene units.

X and T together with Z represent the terminal, water-solubilizing portion of the fluorochemical hydrophilicity imparting compound. T is hydrogen or an organic group that has no more than about 6 carbon atoms, and preferably it has between about 1 to 4 carbon atoms. Examples of T groups include $C_1$–$C_6$ alkyl groups or —$COR^1$ where $R^1$ is an alkyl group of about 1 to 5 carbon atoms. X is oxygen or NR where R is a hydrogen atom or an alkyl or aryl group.

Examples of the residue, —Z—X—T, in formula (I) include:

—($OCH_2CH_2$)$_8$—OH
—($OCH_2CH_2$)$_6$—OH
—($OCH_2CH_2$)$_8$—$OCH_3$
—($OCH_2CH_2$)$_6$—$OCH_3$
—($OCH_2CH_2$)$_8$—$OCH_2CH_3$
—($OCH_2CH_2$)$_6$—$OCH_2CH_3$

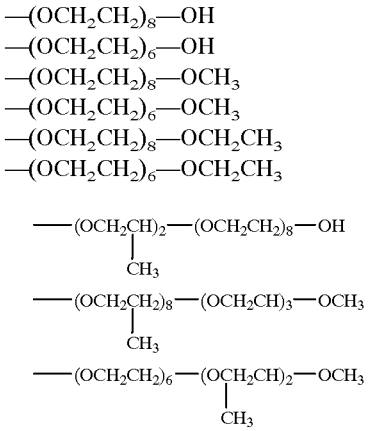

Particularly preferred fluorochemical hydrophilicity imparting compounds of the invention correspond to the following general formula (II):

wherein $R_f$, X, T and Q have the same meaning as defined in formula (I), $R^2$ and $R^3$ each independently can be selected from the group consisting of alkylene groups having about 2 to 4 carbon atoms, and i and j each represent a value of 0 to about 25 with the proviso that i+j is between about 4 and 25. Most preferably, $R^2$ is ethylene and i is larger than j.

Specific examples of hydrophilicity imparting fluorochemical compounds include:

$C_8F_{17}SO_2N(C_2H_5)CH_2CH_2(OCH_2CH_2)_7OCH_3$
$C_8F_{17}SO_2N(C_2H_5)CH_2CH_2(OCH_2CH_2)_9OCH_2CH_3$
$C_7F_{15}SO_2N(CH_3)CH_2CH_2(OCH_2CH_2)_7(OCH_2CH(CH_3))_4OH$
$C_8F_{17}SO_2N(C_2H_5)CH_2CH_2NHCH_2CH_2(OCH_2CH_2)_9NHC(O)$—$CH_3$
$F(CF_2CF_2)_nCH_2CH_2O(CH_2CH_2O)_xH$ wherein the last formula represents a mixture of compounds in which n is a number of about 2 to 6, and an average value of about 4, and x is about 14.

The hydrophilicity imparting fluorochemical compounds useful in the present invention can be prepared using known methods such as those described in U.S. Pat. No. 2,915,554 (Albrecht et al.). The Albrecht patent discloses the preparation of fluoroaliphatic group-containing, non-ionic compounds by reacting active hydrogen-containing fluorochemical intermediates, such as fluoroaliphatic alcohols (e.g. $R_fC_2H_4OH$), acids (e.g., $R_fSO_2N(R')CH_2COOH$), and sulfonamides (e.g., $R_fSO_2N(R')H$), with intermediates such as ethylene oxide, to yield, respectively, $R_fC_2H_4O(C_2H_4O)_nH$, $R_fSO_2N(R')CH_2CO_2(C_2H_4O)_nH$, and $R_fSO_2N(R')(C_2H_4O)_nH$, where n is a number greater than about 3 and R' is hydrogen or lower alkyl (e.g., 1 to 6 carbons). Analo-gous compounds can be prepared by treating the intermediates with propylene oxide or a mixture of ethylene oxide and propylene oxide. See also the fluoroaliphatic oligomers disclosed in U.S. Pat. No. 3,787,351 (Olson), and certain fluorinated alcohol and ethylene oxide condensates described in U.S. Pat. No. 2,723,999 (Cowen et al.).

The films of the present invention can be produced by extrusion of the thermoplastic polymer. Typically, a melt of the thermoplastic polymer is forced through an extrusion head with a rotating screw. The thermoplastic polymer composition can be extruded in thick form and cut into chips or granules for later use in extrusion (for example, like in a masterbatch), or can be directly extruded in a thin film. The extruded films can be mono- or bi-axially oriented by stretching the film in one or two directions that are orthogonal to each other. Typically, the stretch ratio is between 1:2 and 1:5.

In a preferred embodiment, the film is prepared by melting the thermoplastic polymer composition and then extruding it through a suitable distribution head and chilling the film between two rolls. Depending on the surface of these rolls, films can be produced that are smooth on both sides, rough on both sides or rough on one side and smooth on the other side. Examples of distribution heads for use in this invention include heads having two channels configured as an A-B-A configuration or an A-B configuration and distribution heads with three channels in an A-B-C configuration. By feeding the channels with different thermoplastic polymer compositions, multi-layer films can be obtained. For example, with an A-B-A configured distribution head, the B channel may be fed with pure thermoplastic polymer and the A channel with the composition of thermoplastic polymer and fluorochemical hydrophilicity imparting compound. With all channels open, a film will be obtained with a core layer of pure thermoplastic polymer provided on each side with a layer containing the composition of thermoplastic polymer and fluorochemical hydrophilicity imparting compound. Shutting off one of the A channels will result in a two-layer film one with and one without the fluorochemical hydrophilicity imparting compound. Alternatively, the film can be extruded in a blow extrusion which is typically used in the production of packaging film. The melt temperature used in the extrusion process is preferably selected such that the fluorochemical hydrophilicity imparting compound does not degrade or react. For the extrusion of the film, a single screw extruder can be used or a twin screw extruder with the screws counter-rotating or co-rotating. It is particularly preferred in this invention that the thermoplastic polymer composition, which includes the fluorochemical hydrophilicity imparting compound, is extruded in a twin screw extruder with counter rotating screws.

In one embodiment, in a first manufacturing step, using melt extrusion, chips or granules of the thermoplastic polymer and fluorochemical hydrophilicity imparting compound are prepared. These chips can then be used as an additive in the extrusion of a film or they can be used to extrude into a film. In a second step, the thermoplastic polymer fluorochemical hydrophilicity imparting compound chips or granules are used in a polymer extrusion feedstock along with chips or granules of the same pure thermoplastic polymer to produce a film.

The ratio of thermoplastic polymer to fluorochemical hydrophilicity imparting compound in the chip will vary based on the end use of the chip. In general, if the chip is to be extruded into a film or layer of a film without the addition of chips of pure thermoplastic polymer, less fluorochemical hydrophilicity imparting compound will be used than if the chip is to be diluted with pure thermoplastic polymer chips. In a preferred embodiment, the ratio of thermoplastic polymer to fluorochemical hydrophilicity imparting compound in the chip is between about 3:1 and 1000:1, and more preferably between about 20:1 and 4:1.

In accordance with the method of the present invention, the film is provided with a coating of a non-volatile component. As set out in detail above, at least one of the two major surfaces of the film is formed by a thermoplastic polymer layer that contains the fluorochemical hydrophilicity imparting compound. Such a surface is readily coatable with any type of coating, in particular aqueous coatings. In connection with this invention, the term "non-volatile" means any type of compound that does not substantially vaporize under ambient conditions of temperature and pressure (about 25° C. and about 1 atm). The coatings used in the invention may additionally contain volatile components that evaporate upon drying. Typically, such volatile components are used as a medium for applying the non-volatile components. Alternatively, the coating may consist of non-volatile components only. The film of the invention is particularly suitable for coatings that contain water and low viscosity aqueous coatings can readily be applied to the film. For example, aqueous coatings with a viscosity of less than about 10,000 cps or even less than 5,000 cps can be applied.

The coating of the present invention may be applied in a continuous or a discontinuous manner. In connection with the invention, the term "discontinuous" means that along at least one of two orthogonal axes that are in plane of the film, the coating is interrupted one or more times. In other words, along at least one of these axes there will be areas of the film surface that are covered and areas that are not covered. The term "continuous" means that the coating is not interrupted along the axes. However, the term continuous does not imply that the total film surface is covered by the coating.

The coating of the present invention can be applied by any coating technique known in the art. Examples of coating techniques include lamination, printing, gravure coating, knife coating, blade coating, bar coating, air knife coating, roll coating, reverse roll coating, knife over roll coating, wire wound rod coating and spray coating. The coating technique of choice will generally depend on the kind of coating that is to be applied.

According to an embodiment of the present invention, the film can be provided with an adhesive coating, for example an acrylic adhesive coating. Acrylic adhesives that can be applied are well known in the art and include adhesives that comprise a polymer containing an acrylic or methacrylic acid and an alkyl ester of an acrylic or methacrylic acid. Typically, the alkyl ester contains about 4 to 12 carbon atoms in the alkyl group. Examples of alkyl esters of acrylic or methacrylic acid include n-butyl, n-pentyl, n-hexyl, cyclohexyl, isoheptyl, n-nonyl, n-decyl, isohexyl, isobornyl, 2-ethyloctyl, isooctyl, n-octyl and 2-ethylhexyl acrylates and methacrylates. The acrylic adhesive polymer may contain further monomers to tailor the specific properties of the adhesives. Further details on adhesives and in particular acrylic adhesives can be found in Handbook of Pressure Sensitive Adhesive Technology, Edited by Donatas Satas, Second Edition 1989. The adhesive may be applied from an aqueous solution or non-aqueous solution.

The invention will now be illustrated by reference to the following examples, without however the intention to limit the invention thereto. All parts, ratios, percentages etc. in the following examples, are by weight unless otherwise noted.

EXAMPLES

Testing procedures

The following tests were used to evaluate the invention.

Coatability

Films were knife coated with water-based acrylic adhesives in order to obtain a dry coating of 0.05 mm thickness. After coating, the sample was dried in an oven at 90° C. for 10 min. The adhesive coating was visually inspected for defaults and was given a rating according to the following scale:

Excellent: very good coating with little or no irregularities

Good: acceptable coating with few defaults and/or little shrinkage at the edges

Bad: unacceptable coating with big crater formation and/ or a lot of shrinkage.

The coated films were covered with siliconized paper release liner and conditioned at room temperature (RT) or 50° C. for 7 days. Adhesion was measured according to the following test methods:

180° Peel Adhesion Glass

This test was conducted in accordance with PSTC-7, a procedure specified in "Test Methods for Pressure-Sensitive Tapes", 8th Edition. The adhesion was measured in oz/inch and reported in N/dm.

180° Peel Adhesion Stainless Steel and Polyethylene

The force required to remove adhesive-coated films applied to standard stainless steel or polyethylene surfaces was measured according to the AFERA 4001 test method.

Quick Stick

This test, which measures the ability of adhesive tape to adhere to a surface after application of very light pressure, was performed according to the AFERA 4015 test method.

Abbreviations

The following abbreviations and trade names are used in the examples:

MeFOSA: $C_8F_{17}SO_2N(CH_3)H$

Genopol™ 26-L-80: $C_{12-16}H_{25-33}(OCH_2CH_2)_{9.5}OH$, derived from a primary alcohol, commercially available from Hoechst Celanese Corp., USA Triton™ X-100: an ethoxylated (9.5) alkylphenol, commercially available from Union Carbide Corp., USA Adh 1: acrylic waterbased adhesive with a viscosity of 15000 cps and 43% solids Adh 2 acrylic waterbased adhesive with a viscosity of 15000 cps and 56% solids Adh 3: acrylic waterbased adhesive with a viscosity of 900 cps and 43% solids Adh 4: acrylic waterbased adhesive with a viscosity of 1020 cps and 43% solids Alfonic™ 6–8.5: $C_6H_{13}(OCH_2CH_2)_{8.5}OH$, available from Condea-Vista, Austin PE: polyethylene SS: stainless steel cps: centipoises RT: room temperature PP 4352 F1: polypropylene with a melt flow index of 2.5, available from Exxon, Belgium HIC-1: $C_8F_{17}SO_2N(C_2H_5)CH_2CH_2O(CH_2CH_2O)_7CH_3$, prepared according to U.S. Pat. No. 2,915,554.

HIC-2: $C_8F_{17}SO_2N(C_2H_5)(C_2H_4O)_nH$ (n=14), nonionic fluorochemical surfactant, commercially available from 3M.

HIC-3: $C_8F_{17}SO_2N(C_2H_5)(C_2H_4O)_2(C_3H_6O)_6H$, nonionic fluorochemical surfactant, commercially available from 3M HIC-4: MeFOSA/Alfonic™ 6-8.5, prepared according to the procedure for the synthesis of fluorochemical F-18, in U.S. Pat. No. 5,804,625, but the Alfonic™ 6–8.5 product was used instead of the Triton™ X-100 product.

HIC-5: A nonionic fluorochemical surfactant, commercially available from Dupont de Nemours as Zonyl™ FSN, believed to be a mixture of compounds represented by the formula $F(CF_2CF_2)_nCH_2CH_2O(CH_2CH_2O)_{14}H$ wherein n has a value of 2 to 6 and the average thereof is about 4.

HIC-6: a 50/50 blend of Triton X-100 with $C_8F_{17}SO_2N(CH_3)(C_2H_4O)_{9.5}C_6H_4C(CH_3)_2CH_2C(CH_3)_2CH_3$. The latter fluorochemical was made according to the following procedure. To a 3-necked round bottom flask equipped with an overhead stirrer, thermometer, reflux condensor and two attached gas washing bottles (the second bottle containing a 10% aqueous solution of sodium hydroxide), was charged 646 g (1.0 mole) of Triton™ X-100 and 12.9 g Celite™ filter agent (commercially available from Aldrich Chemical Co.). The mixture was heated to 60° C., then 142.76 g (1.2 mole) of thionylchloride was added via an addition funnel over a period of about 22 minutes, raising the mire temperature to 75° C. Nitrogen was bubbled through the reaction mixture for 4 hours, during which time the mixture temperature varied from 68 to 71° C. The reflux condenser and gas washing bottles were replaced by a still head, and the reaction mixture was stirred while a vacuum of about 50 torr absolute pressure was applied. After the reaction was shown to be complete by $^{13}C$ and $^1H$ analysis of an aliquot, the reaction mixture was filtered hot through a C-porosity fitted glass Buchner funnel to yield a light yellow product, a chloride of Triton™ X-100. To a 3-necked round bottom flask equipped with overhead stirrer, reflux condensor and nitrogen inlet adapter was charged 125 g (0.244 eq) of MeFOSA, 177.80 g of the chloride product from the preparation above, 30.18 g (0.2794 eq, a 15% molar excess) of sodium carbonate and 2.46 g (0.0149 eq, or 6.26 mole percent with respect to MeFOSA) of potassium iodide. The reaction mixture was heated to 120° C. for 8 hours, at which time the MeFOSA had disappeared according to analysis using gas chromatography. After cooling to 95° C., the reaction mixture was washed with 157 g of 10% aqueous sulfuric acid followed by 157 g of deionized water. The washed reaction mixture was concentrated by evaporation on a rotary evaporator at 70° C. and 50 torr absolute pressure to give 252.6 g of a brown liquid (92.2% yield), whose structure was characterized by $^{13}C$ and $^1H$ NMR spectroscopy to be consistent with the desired ether adduct.

HIC-7: a 50/50 blend of Triton™ X-100 with a reaction product of $C_8F_{17}SO_2N(CH_3)$ and Genopol™ 26-L-80. The latter fluorochemical was made according to the general procedure for HIC-1, except that 200.83 g (0.337 eq) of Genopol™ 26-L-80 was reacted with 48.12 g (0.4045 eq, or a 20% molar excess) thionyl chloride in the presence of 5.5 g Celite™ filter agent to make the chloride of Genopol™ 26-L-80. Then 125 g (0.244 eq) of MeFOSA was reacted with 179.93 g (0.249 eq, or a 2% molar excess) of the chloride Genopol™ 26-L-80, 37.71 g (0.355 eq, or a 50% molar excess) of sodium carbonate and 2.76 g (0.0141 eq, or 8.5 mole percent with respect to MeFOSA) of potassium iodide to yield the desired ether adduct.

HIC-8: Triton™ X-100, an ethoxylated (9.5) alkylphenol, commercially available from Union Carbide Corp., USA

HIC-9: $C_8F_{17}SO_2N(C_2H_5)CH_2COO^-K^+$

Film Extrusion

In a first step, masterbatches of polypropylene containing 25% of fluorochemical hydrophilicity imparting compound were prepared. The method of forming the blend was not critical. The blend could be formed by injecting the fluorochemical compound into a twin screw extruder barrel in which the polypropylene was already in a molten state.

The extruded compound was then cut into granules or pellets. In a second step, the granules were further blended with polypropylene in various amounts to give different ratios of polypropylene to fluorochemical hydrophilicity imparting compound. The blends of polypropylene and fluorochemical hydrophilicity imparting compound were extruded with neat polypropylene using a single screw extruder and a twin screw extruder respectively. The extruder head combining the two extruders had an A-B-A configuration, determined by a A-B-A distribution head. Depending on the desired film formation, channel(s) could be closed off The temperature of the extruder was kept below 310° C. in order to avoid degradation of the polypropylene and/or fluorochemical hydrophilicity imparting compound. During extrusion the motor current and energy consumption were reduced when the melt contained the fluorochemical hydrophilicity imparting compound. After extrusion, the film was chilled between two rolls, a polished steel roll and a silicon rubber coated roll, to give the film a flat or rough surface, respectively. The film was not stretched after extrusion unless otherwise specified. The extruded film was visually inspected for the surface quality. Excellent film quality with no ruptures or defaults in the topliners was observed. When a multilayer film was produced, no delamination between the different layers was observed.

Examples 1 to 2

In a first set of experiments, neat PP 4352 F1 was coextruded with PP 4352 F1 containing 4% HIC-1. For this experiment, one A channel of the distribution head was shut off. After extrusion, the film side containing the fluorochemical hydrophilicity imparting compound was brought into contact with the polished steel chill roll to impart a smooth surface to the film. The smooth film surfaces were then coated with two water-based adhesives having viscosities of 15,000 cps. After drying, uniform adhesive coatings with thicknesses of 0.05 mm were obtained. The adhesive coatings were covered with Steralease Si-paper release liners (available from Sterling) and the samples were conditioned for 7 days, at room temperature and at 50° C. After conditioning, the release liners were removed and the coated film was applied to different surfaces. The composition and adhesion behavior of the coated films are given in Table 1.

TABLE 1

Adhesive Performance of Water-Based Adhesives Coated on Coextruded Hydrophilic Polypropylene Liner

| Ex No. | Adhesive | Conditioning | 180° peel SS (N/dm) | 180° peel PE (N/dm) | 180° peel glass (N/dm) | Quick stick (N/cm) |
|---|---|---|---|---|---|---|
| 1 | Adh 1 | 7d/RT | 78 | 84 | 99 | 3.5 |
|   |       | 7d/50° C. | 73 | 86 | 109 | 3.7 |
| 2 | Adh 2 | 7d/RT | 92 | 61 | 123 | 3.7 |
|   |       | 7d/50° C. | 100 | 81 | 130 | 3.7 |

In all cases, clean peel from the substrate and no delamination of the adhesive from the film was observed. This means that the adhesive had good anchorage to the film.

Except for the adhesion to PE, heat aging did not cause major differences in adhesion values, indicating little or no migration of the fluorochemical hydrophilicity imparting compound into the adhesive layer. In some cases, the polypropylene film was elongated due to the peel forces applied. This may have happened because the films were not stretched after extrusion. No delamination between the two polypropylene layers of the films was observed.

Examples 3 and 4 and Comparative Examples C-1 to C-3

In Examples 3 and 4 three-layer films were extruded (thicknesses 5 μ-55 μ-5 μ). The center layer was made from neat PP 4352 F1 and the outer layers were made from a mixture of PP 4352 F1 and fluorochemical hydrophilicity imparting compound as given in Table 2. For this experiment, the chilled rolls were both made of silicone rubber. In all cases, bright transparent films of good quality were obtained and no delamination between the film layers was observed. Comparative Example C-1 was made using a similar process, but HIC-6 was used. Comparative Example C-2 was a single layer film PP 43 52 F1 and Comparative Example C-3 was a corona treated polypropylene film (single layer film). The films were evaluated for their coatability with waterbased acrylic adhesive, Adh 3, which had a viscosity of 900 cps. The adhesive was knife coated on one outer layer of the films and dried at 95° C. for 10 minutes. The coatability of the outer layer was evaluated. The results are given in Table 2.

TABLE 2

Composition and Coatability of Coextruded Polypropylene Films

| Ex No | Fluorochemical | Coatability | Surface Texture Before Coating |
|---|---|---|---|
| 3 | 1% HIC-1 | Good | Smooth |
| 4 | 4% HIC-1 | Excellent* | Very Smooth |
| C-1 | 2% HIC-6 | Bad | Rough to Smooth |
| C-2 | — | Bad | Rough |
| C-3 | — | Excellent | Rough |

*Coatability of the film remained excellent even after it was aged at RT for 8 months.

When compositions comprising fluorochemical were extruded in these trials, no burned polypropylene residues were observed at the lip of the extruder head, which was normally the case when neat polypropylene was extruded. The extruded multilayer films were monoaxially stretched 1:4. No delamination between the different layers was observed and stretching had no visible influence on the quality of the film.

Comparative Examples C-4 to C-6

In Comparative Examples C-4 to C-6, three-layer films were prepared (thicknesses: 5 μ-35 μ-5 μ) using neat PP 4352 F1 in the middle layer and a blend of PP 4352 F1 with the fluorochemicals listed in Table 3 in the outer layers. The chilled rolls were a plasma coated metal roll and a silicone rubber roll, providing a rough surface to the film. Clear, bright transparent films were obtained. The composition and coatability of the coextruded films are given in Table 3. Adh 3 was used as the coating.

TABLE 3

Composition and Coatability of Comparative Coextruded Polypropylene Films

| Ex No. | Fluorochemical | Coatability |
|---|---|---|
| C-4 | 4% HIC-8 | Bad |
| C-5 | 6% HIC-6 | Bad |
| C-6 | 6% HIC-7 | Bad |

The data shows that the films had unacceptable coatability for the low viscosity water based adhesive.

Examples 5 to 7

In Examples 5 to 7, monolayer films of polypropylene containing different amounts of fluorochemical hydrophilicity imparting compound (as given in Table 4) were extruded using a twin screw extruder. Cromated polished cooling rolls were used, providing the film with a smooth surface. After extrusion, the films were coated with a low viscosity water based acrylic adhesive (Adh 3; viscosity 900 cps). The composition and coatability are given in Table 4.

TABLE 4

Composition and Coatability of Monolayer Polypropylene Containing Fluorochemical Hydrophilicity Imparting Compound

| Ex No | % HIC-1 | Coatability |
|---|---|---|
| 5 | 0.25 | Good |
| 6 | 0.50 | Excellent |
| 7 | 4 | Good** |

**Due to the high content of fluorochemical hydrophilicity imparting compound in the monolayer film, slippage during winding of the film occurred resulting in a lower tension on winding and wrinkling of the film which impacted coatability.

Even small amounts of fluorochemical hydrophilicity imparting compound added to the polypropylene melt provided films of good to excellent coatability with the very low viscosity water-based adhesives used.

Examples 8 to 17

In Examples 8 to 17, neat PP 4352 F1 was coextruded with PP 4352 F1 containing fluorochemical hydrophilicity imparting compound as recorded in Table 5. For these experiments, one A channel of the distribution head was shut off. After extrusion, the film side containing the fluorochemical hydrophilicity imparting compound was brought into contact with the polished steel chill roll so as to give that side a smooth surface. The extruded films were monoaxially stretched 1:4. In all cases, bright transparent films of good quality were obtained and no delamination between the two layers was observed. Comparative Example C-7 was made with pure polypropylene. The films were evaluated for their coatability with water based acrylic adhesive (Adh 4) having a viscosity of 1020 cps. The adhesive was knife coated on the layer containing the fluorochemical and dried at 90° C. for 10 minutes. The coatability was evaluated and the results are recorded in Table 5.

TABLE 5

Composition and Coatability of Coextruded Polypropylene Films

| Ex No. | Fluorochemical | Coatability |
|---|---|---|
| 8 | 0.5% HIC-1 | Excellent |
| 9 | 2% HIC-1 | Good |

TABLE 5-continued

Composition and Coatability of Coextruded Polypropylene Films

| Ex No. | Fluorochemical | Coatability |
|---|---|---|
| 10 | 0.5% HIC-2 | Good |
| 11 | 2% HIC-2 | Excellent |
| 12 | 0.5% HIC-3 | Bad |
| 13 | 2% HIC-3 | Bad |
| 14 | 0.5% HIC-4 | Good |
| 15 | 2% HIC-4 | Good |
| 16 | 0.5% HIC-5 | Excellent |
| 17 | 2% HIC-5 | Good |
| C-7 | — | Bad |

It was observed that small amounts of fluorochemical hydrophilicity imparting compound added to the polypropylene melt provided a film with improved coatability. In case of HIC-3, it is believed that the fluorochemical hydrophilicity imparting compound was not sufficiently hydrophilic for this composition.

Comparative Examples C-8 and C-9

In Comparative Examples C-8 and C-9, neat PP 4352 F1 was coextruded with PP 4352 F1 containing HIC-9 as recorded in Table 6. For these experiments, one A channel of the distribution head was shut off. After extrusion, the film side containing the fluorochemical was brought into contact with the polished steel chill roll so as to give that side a smooth surface. The extruded films were monoaxially stretched 1:4. The films were evaluated for their quality and coatability with waterbased acrylic adhesive (Adh 4) having a viscosity of 1020 cps. The adhesive was knife coated on the layer containing the fluorochemical and dried at 90° C. for 10 minutes. The coatability was evaluated and the results are recorded in Table 6.

TABLE 6

Composition and Coatability of Coextruded Polypropylene Films

| Ex No. | Fluorochemical | Film Quality | Extrusion | Coatability |
|---|---|---|---|---|
| C-8 | 0.5% HIC-9 | Good | OK | Bad |
| C-9 | 2% HIC-9 | Bad | Smoke + Smell | Bad |

What is claimed is:

1. Method of making a coated film comprising the steps of:
   (A) providing a film comprising a layer of thermoplastic poly(alpha)olefin having dispersed therein fluorochemical hydrophilicity imparting compound according to the formula:

$$R_f\text{—}Q\text{—}Z\text{—}X\text{—}T$$

wherein:
   $R_f$ represents a partially or fully fluorinated aliphatic group having at least 3 carbon atoms,
   Q is a linking group or a covalent bond,
   Z is a poly(oxyalkylene) group,
   X is oxygen or NR, wherein R is a hydrogen atom or an alkyl or aryl group, and
   T is a hydrogen atom or an organic group having no more than about 6 carbon atoms;
   (B) applying a aqueous coating comprising at least one non-volatile component on said film; and
   (C) drying said coating.
2. The method according to claim 1, wherein said fluorochemical hydrophilicity imparting compound is present in said layer of thermoplastic polymer in an amount of at least 0.2% by weight based on the weight of thermoplastic polymer.
3. The method according to claim 1, wherein said thermoplastic polymer is polypropylene.
4. The method according to claim 1, wherein said coating is provided on said film in a discontinuous manner.
5. The method according to claim 1, wherein said coating is provided on said film in a continuous manner.
6. The method according to claim 1, wherein said fluorochemical hydrophilicity imparting compound corresponds to the formula:

$$R_f\text{—}Q\text{—}(OR^2)_i\text{-13 }(OR^3)_j\text{—}X\text{—}T$$

wherein:
$R_f$ represents a partially or fully fluorinated aliphatic group having at least 3 carbon atoms,
Q is a linking group or a covalent bond,
X is an oxygen atom or NR, wherein R is a hydrogen atom or an alkyl or aryl group, and
T is a hydrogen atom or an organic group having no more than about 6 carbon atoms;
$R^2$ and $R^3$ are each independently selected from the group consisting of alkylene groups having 2 to 4 carbon atoms; and
i and j each represent a value of 0 to 25 with the proviso that i j is between 4 and 25.
7. The method according to claim 1, wherein said Z group contains between 4 and 25 oxyalkylene units.
8. The method according to claim 1, wherein the majority of oxyalkylene units in the Z group are oxyethylene units.
9. The method according to claim 1, wherein the Z group is a polyoxyethylene group having 4 to 25 oxyethylene units.
10. The method according to claim 1, wherein the step of providing said film comprises the step of melt extruding a mixture of thermoplastic polymer and fluorochemical hydrophilicity imparting compound to form the layer of thermoplastic polymer having dispersed therein the fluorochemical hydrophilicity imparting compound.
11. The method according to claim 1, wherein $R_f$ contains between 6 and 20 carbon atoms and the terminal portion of the $R_f$ group consists of at least four fully fluorinated carbon atoms.
12. The method according to claim 1, wherein said film is a multilayer film comprising as an outermost layer said layer of thermoplastic polymer having fluorochemical hydrophilicity imparting compound dispersed therein and said coating is applied to said outermost layer.
13. The method according to claim 12, wherein said film comprises a first and second layer of thermoplastic polymer, said first and second layer being in contact with each other and said second layer forming an outermost layer of said film, said first layer being substantially free of said fluorochemical hydrophilicity imparting compound and said second layer having dispersed therein said fluorochemical hydrophilicity imparting compound.
14. The method according to claim 13, wherein said film further comprises a third layer of thermoplastic polymer that forms a second outermost layer of said film and is in contact with said first layer, said third layer having said fluorochemical hydrophilicity imparting compound dispersed therein.
15. The method according to claims 13 or 14, wherein said second and/or third layer each have a thickness of not more than 30 $\mu$cm.
16. The method according to any of the preceding claims, wherein the film is mono-axially or biaxially oriented.

* * * * *

UNITED STATES PATENT AND TRADEMARK OFFICE
CERTIFICATE OF CORRECTION

PATENT NO.     : 6,476,114 B2
DATED          : November 5, 2002
INVENTOR(S)    : Goeman, Bart O.

It is certified that error appears in the above-identified patent and that said Letters Patent is hereby corrected as shown below:

Title page,
Item [56], References Cited, U.S. PATENT DOCUMENTS, delete "Paessehen" and insert in place thereof -- Paessechen --.
Item [57], ABSTRACT,
Line 5, delete "Rf" and insert in place thereof -- $R_f$ --.

Column 4,
Line 26, delete "R" and insert in place thereof -- $R_f$ --.
Lines 33 and 34, delete "$CF_3CF_2CF_2CF_2$13, $(CF_3)_2CFCF_2$—" and insert in place thereof -- $CF_3CF_2CF_2CF_2$—,$(CF_3)_2CFCF_2$—. --.

Column 8,
Line 45, please insert -- : -- following "2".

Column 9,
Line 25, delete "mire" and insert in place thereof -- mixture --.

Column 10,
Line 22, insert -- . -- following "off".

Column 11,
Line 24, delete "43 52" and insert in place thereof -- 4352 --.

Column 13,
Line 63, delete "a" and insert in place thereof -- an --.

UNITED STATES PATENT AND TRADEMARK OFFICE
CERTIFICATE OF CORRECTION

PATENT NO. : 6,476,114 B2
DATED : November 5, 2002
INVENTOR(S) : Goeman, Bart O.

It is certified that error appears in the above-identified patent and that said Letters Patent is hereby corrected as shown below:

Column 14,
Line 14, delete "—13" and insert in place thereof -- — --.
Line 28, delete "i j" and insert in place thereof -- i + j --.
Line 63, delete "$\mu$cm" and insert in place thereof -- $\mu$m --.

Signed and Sealed this

Twenty-fifth Day of October, 2005

JON W. DUDAS
*Director of the United States Patent and Trademark Office*